April 19, 1966  G. F. QUITTNER  3,247,453
MAGNETIC FLAW DETECTOR WITH EXCITING AND
SENSING COILS AXIALLY ALIGNED ON
OPPOSITE SIDES OF THE MATERIAL
Filed March 9, 1961  3 Sheets-Sheet 1
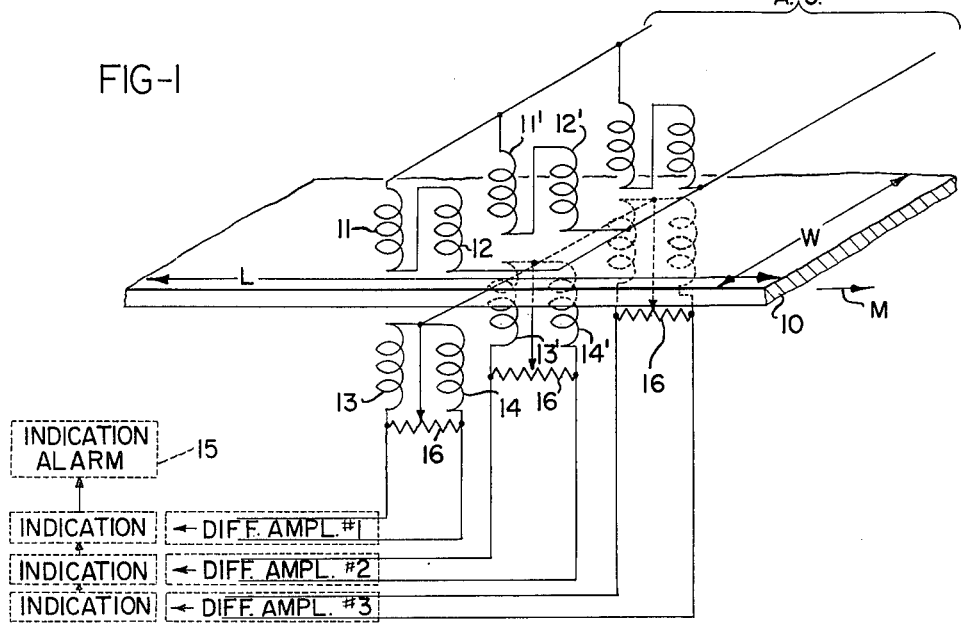
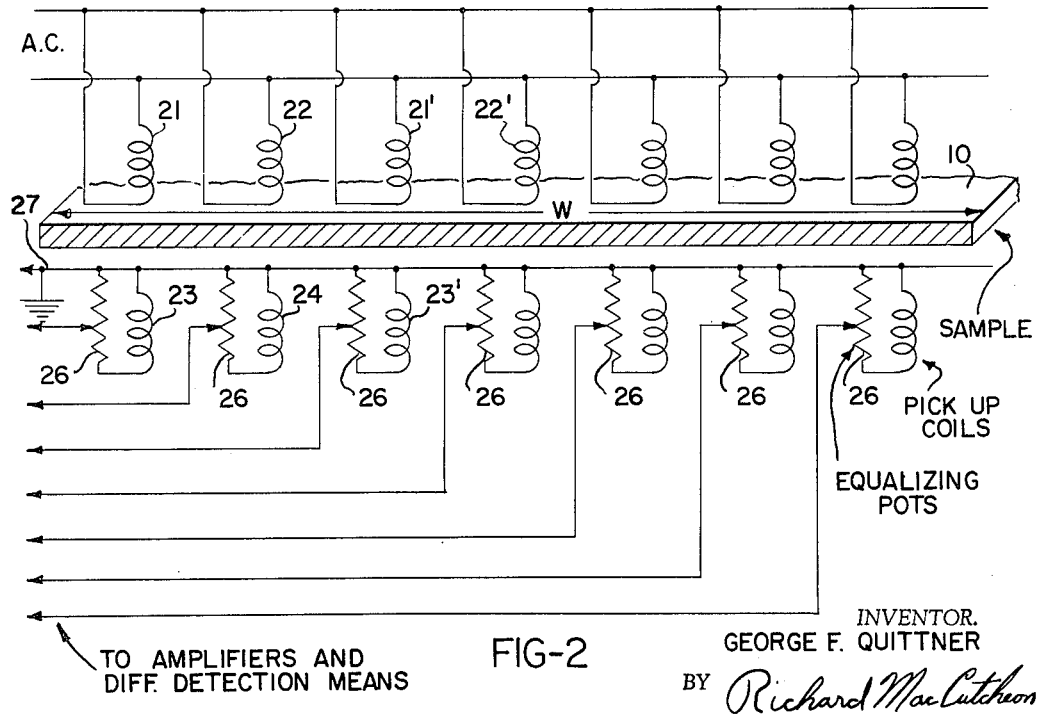
INVENTOR.
GEORGE F. QUITTNER
BY Richard MacCutcheon
ATTORNEY FIG-6 A.C. SIGNALS FROM AMPLIFIERS
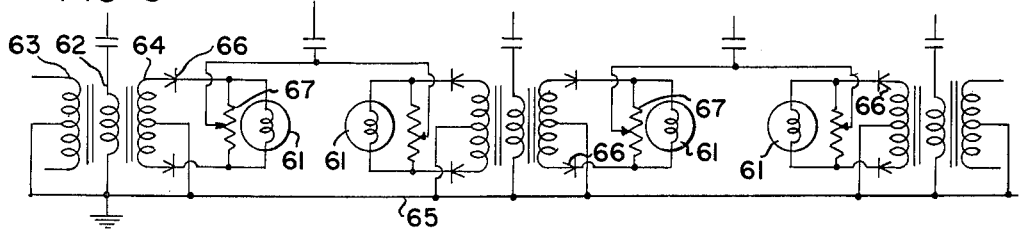
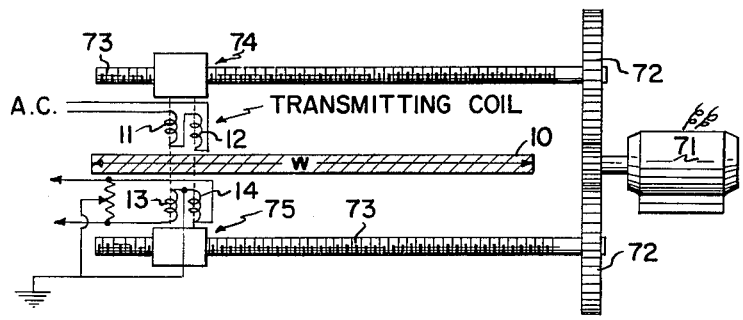
FIG-7
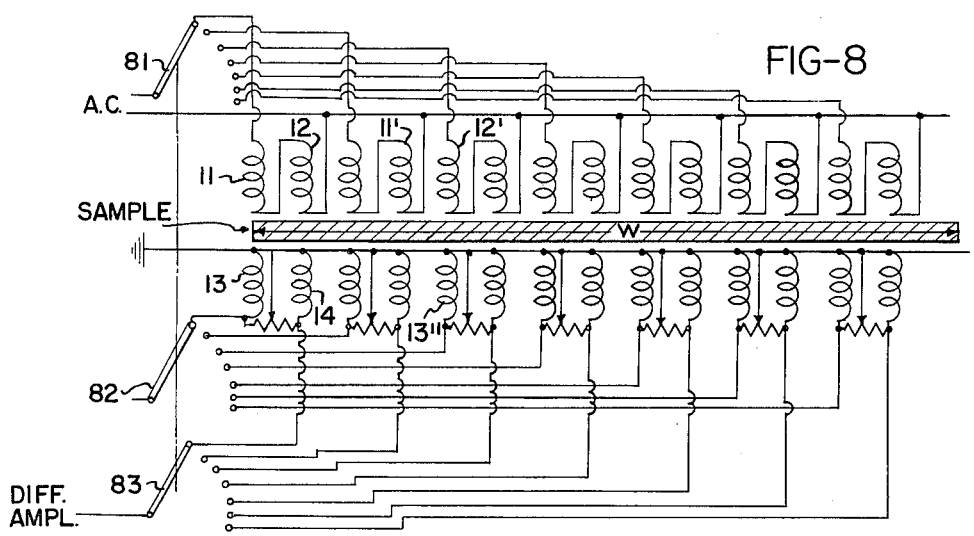
FIG-8
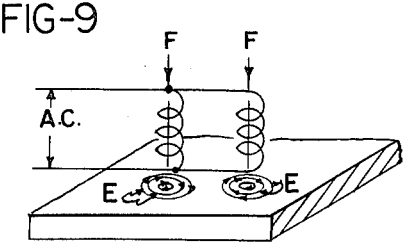
FIG-9
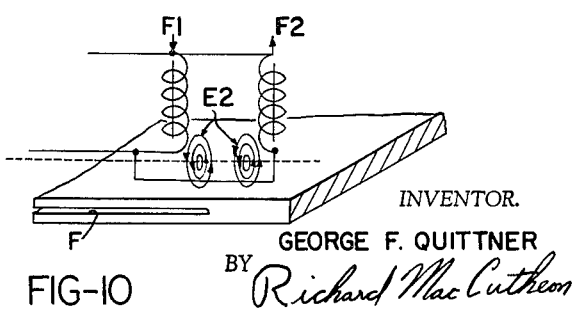
FIG-10
INVENTOR.
GEORGE F. QUITTNER
BY Richard MacCutcheon
ATTORNEY

United States Patent Office 3,247,453
Patented Apr. 19, 1966

3,247,453
MAGNETIC FLAW DETECTOR WITH EXCITING AND SENSING COILS AXIALLY ALIGNED ON OPPOSITE SIDES OF THE MATERIAL
George F. Quittner, Cleveland Heights, Ohio, assignor, by mesne assignments, to API Instruments Company, Chesterland, Ohio, a corporation of Ohio
Filed Mar. 9, 1961, Ser. No. 94,472
5 Claims. (Cl. 324—37)

The present invention relates to equipment for non-destructively testing materials by the use of magnetic fields.

There are a great many devices patented, and some in practical use, for detecting flaws and flawlike conditions in extended lengths of materials which are relatively long in one dimension only. Thus for testing hollow pipes, welding rods, electrical power transmission wires, and the like, current may be applied in various directions to induce flux and/or eddy currents into the material under test and like arranged pickup coils may be employed to sense fields and field distortions resulting from flaw conditions. See for example my co-pending application, S.N. 82,348, filed January 12, 1961, and now abandoned, and assigned to the assignee of the present invention. The problem of making uniform linkage with a body of material under test leaves some question as to whether a particular signal arises from a detected flaw or some irrelevant noise source. Even in the simple case of wires passing through testing coils, extraneous signals may easily arise and be indistinguishable from true flaw signals. Despite the difficulties and problems mentioned, non-destructive magnetic testing for flaws in materials having only one extended dimension is widely practiced and useful.

For sheet materials extended in two dimensions as compared with the third, relatively little background exists. It is known to examine sheet materials with X-rays or nuclear radiation, but such techniques are little practiced except for thickness control, where an average reading is useful. It is known to expose sheets to ultrasonic energy as a means of flaw detection, but the technique is subject to a number of problems associated with the effects of scale and unevenness on the metal surfaces, transducer wear, transducer cost, and the high cost of paralleling channels to provide simultaneous information from a group of transducers set side by side to examine a cross-section and therefore examine any sheet length by moving the sheet through such a pickup.

In sheet steel material finishing mills, a common and expensively troublesome flaw condition known as a "lamination" takes the form of "pipe" forming a space between layers terminating within the sheet edges, or it may be a separation, or the inclusion of slag or oxides, extending inward some distance from one edge. Such a flaw condition may exist anywhere in an extended strip, but it is most likely to be found in the vicinity of a weld, where the end of one strip is attached to the beginning of the next. Thus far, suitable means have not been found for quickly finding the exact location of such flaws.

It is an object of the present invention to provide simple and inexpensive means for overcoming the above mentioned difficulties.

Another object is to provide stable and reliable flaw detecting means for determining flawlike non-homogenities in extended lengths of relatively wide material of essentially constant smaller thickness together with the rejection of spurious signals.

In accordance with one aspect of the present invention I achieve these and other objects and provide many advantages by placing flux transmitting and receiving means respectively on opposite sides of the material being tested for the non-destructive inspection of electrically conductive and/or magnetic sheet material. Preferably at least a pair of magnetic flux producing coils are on one side of the material, as regards its thickness, and at least two flux sensing coils are correspondingly located on the opposite side of the material. The flux sensing coils are connected as pairs to means for determining the differences between signals received by said coils so that any such difference definitely indicates a sample condition difference geometrically located between the positions of two sensing coils.

Other objects and advantages will be apparent and the invention may be better understood by consideration of the following description taken in connection with the accompanying drawings, in which:

FIG. 1 is simplified diagram of a preferred arrangement according to the invention;

FIG. 2 shows a modification;

Figure 3:
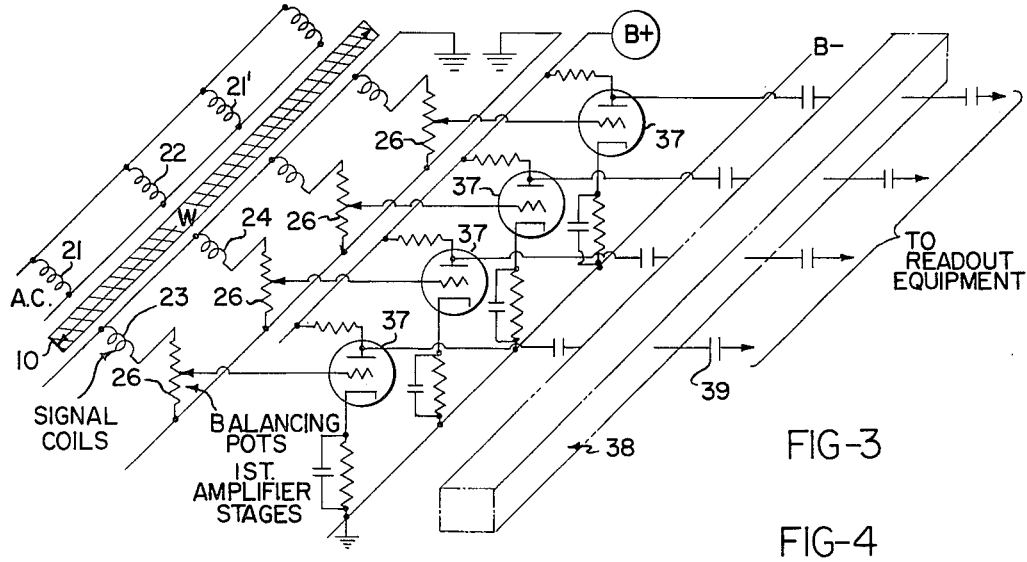
FIG. 3 shows a difference detection amplifying arrangement which may be used with arrangements such as those of FIGS. 1 and 2.
Figure 4:
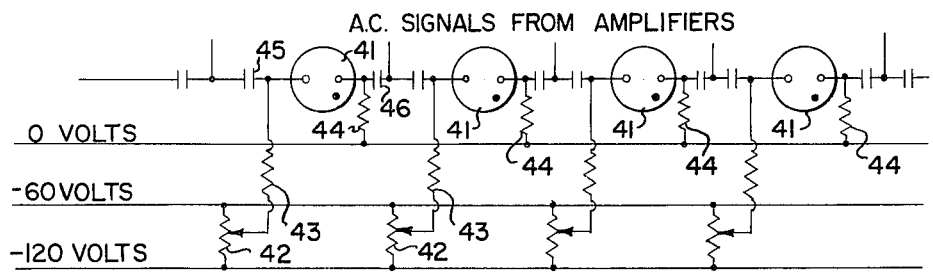
Figure 5:
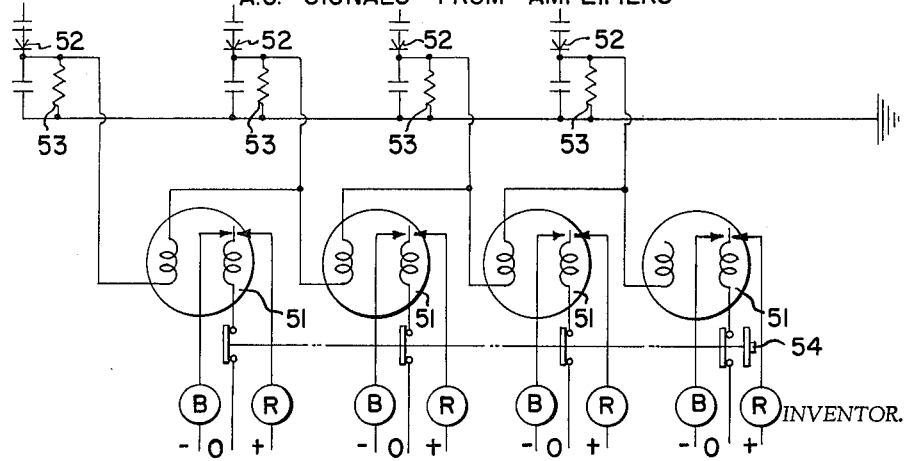

FIG. 4 schematically shows a neon tube apparatus useful for reading out devices according to FIGS. 1 or 2 and 3;

FIG. 5 shows a modified readout example, in this case using contact meters;

FIG. 6 shows a modification in which readout is by the sensing of phase differences;

FIG. 7 shows an electrically simple means for inspecting stationary samples across their width by mechanical traverse;

FIG. 8 shows a modification in which there is electrical scanning;

FIG. 9 shows one arrangement of flux producing coils;

FIG. 10 shows a modified arrangement of flux producing coils which may be useful in connection with the arrangements shown in FIGS. 1, 2, 3, 7 and 8.

Referring now to FIG. 1, an elongated sheet 10 having a width W is assumed to be moving in the direction of its length L, as indicated by the arrow M, during readout as about to be described. The sheet may be of steel, or of aluminum, or of other magnetic or conductive material, and at one side of it, as regards its thickness, there are plural pairs of flux producing coils 11, 12, 11', 12' and so on, with the coils of each pair relatively displaced along the direction of relative motion of sample as regards flux producing and flaw detecting apparatus, while the plural pairs are displaced from one another transverse to the direction of motion, or in other words along the width W. These flux producing coils are fed from a source "A.C." which may conveniently be of about 5 volts at from 250 c.p.s. to 10 kc. per second.

On the opposite side of the sample sheet, as regards its thickness, there are correspondingly arranged pairs of pickup coils 13, 14, 13', 14', etc. The coils of each pair are connected in series subtractively and a difference signal is read, after suitable amplification, from the leads from each pair. Thus the wires in 13, 14 may go to a difference amplifier No. 1, which may be exactly the same as the difference amplifier illustrated and described in connection with FIG. 1 of the above mentioned co-pending application describing a two stage grounded neutral vacuum tube amplifier. This differenec amplifier No. 1 may in turn feed a readout device such as a vacuum tube volt meter (as illustrated and described in connection with FIG. 1 of the co-pending application). Similarly the wires from pickup coils 13′, 14′ feed a difference amplifier No. 2 which feeds a second indicator and so on, while all the indicators are tied in so that, at proper time, any one of them may sound an indicator alarm shown diagrammatically in the drawing at 15. If desired a potentiometer 16 may be placed across the outgoing leads of each pair with a grounded variable tap of the potentiometer taken to a common junction of the pickup coils of the particular pair. Such potentiometers permit precise coil output balancing. More or less equivalent balancing adjustments may be made by using shifting capacitances, or by the relatively cumbersome method of adding or removing a few turns on individual coils.

In operation, an arrangement according to FIG. 1 will show when a flaw occurs, and will show where it occurs with respect to the width W of the sheet as may be very important, while at the same time the apparatus is designed to read differences which show flaw boundaries with respect to the sample length L.

FIG. 2 shows an arrangement where the sample may be stationary with respect to the flux producing and signal detecing apparatus as when it is desired to find a weak spot in the metal near a weld used for connecting separate lengths of previously coiled strip. Here A.C. is supplied to coils 21, 22, 21′, 22′ all arranged with respect to one another transversely across the width W of the sheet and on one side of the sheet as regards its thickness. On the opposite side of the sheet, sensing coils 23, 24, 23′, etc. are correspondingly located. For each coil a potentiometer 26 is used to derive a signal of adjustable value (according to the setting of the potentiometer) with respect to a common ground lead 27 and these signals are taken to difference detection and amplifier means as before. Of course, the electrical connection arrangement of FIG. 2 might also be used for moving sheet (or moving coil apparatus) with leading and lagging coils arranged by pairs so that arrival of a flaw will affect one or more leading coils before it affects their lagging mates as in FIG. 1.

Those in the art will realize that all of the apparatus depicted in FIG. 2, being only coils and resistances, is relatively inexpensive, for example as compared with the mechanical arrangements later to be described in connection with FIGS. 6 and 7, and that it involves no physical contacts which would cause wear. The interpretation means (as later described) being likewise relatively simple and inexpensive such non-scanning parallel information channels as are suggested by FIG. 2 are very practical.

In FIG. 3, as in FIG. 1 of the co-pending application, the amplifying portions may comprise well known circuits familiar to those acquainted with the electronic art so that they need not be described nor shown in detail.

In FIG. 3 (as in FIG. 2) there is a series of flux producing coils (21, 22, 21′, etc.) across the width W of sample 10 on the opposite side of which are correspondingly located sensing or pickup coils 23, 24, etc. (or the coils might have been both across width W and along length L as in FIG. 1). In FIG. 3, the adjustable taps from equalizing potentiometers 26 become the inputs each to a first stage of a respective one of plural amplifiers having triodes 37, differences being determined by the readout means.

In the co-pending application, the magnetic field generating means was presumed usually non-alternating. With the presently described conditions, A.C. flux producing coil energization is used to produce eddy currents, but the distinction is unimportant in comparing the amplifying and discriminating functions of the various amplifier stages. The first stage having the tubes (or tube sections) 37 simply amplifies all input signals as do any additional stages 38, while the outputs of all the parallel channels can be equalized by potentiometers 26. Then the signals are coupled, as by capacitors 39, to difference sensing readout equipment.

It should be noted that signals from all lines (in FIG. 3) are A.C., and as by use of the potentiometers during initial setup, they can be made precisely equal in both phase and amplitude except in the presence of a flaw. Detection may include not only amplitude difference detection (as in FIG. 4 and FIG. 5 about to be described) but also phase detection (as in FIG. 6), or combinations of the two.

In FIG. 4 one example of readout equipment is shown having neon tubes 41. It is presumed that during operation the resistors (e.g., 42 in FIG. 4) are adjusted so that the neon tubes 41 are all just below firing and all are dark when there is no flaw having a boundary between coils (while if there is a flaw so major it is coextensive with all coils it could be seen visually and there would be no problem, or, if the apparatus and strip are relatively moving, it would be picked up by all readouts as it entered the head). In FIG. 4 isolation resistors 43, 44 and capacitors 45, 46 may be used so that lower voltage bus can be used to supply power for the tubes than would be the case if all were arranged in series across a voltage supply.

FIG. 5 shows a readout example in which indicating meter relays are used to provide continuous reading of random noise as well as contact making with any desired alarming or other action in the presence of flaw conditions. For example a spray gun may be operated to mark the flaw location, or an automatic cut off device may be actuated. As explained in various issued patents, a meter relay (51) may have a sensitive coil to which the signal is fed (as by way of rectifiers 52 and load resistors 53) and a locking coil and locking contacts. The meter relay contacts may be used to sound a common alarm, or as shown to actuate various colored lights at predetermined (and adjustable) limits of meter pointer travel. If each meter relay has a single locking coil, as shown, and both upper and lower limit of travel relatively stationary contacts, a three wire source can be used to provide locking torque in the one direction or the other. Some means of interrupting the locking-coil-locking-contact circuit is needed and in the illustrated embodiment for simplicity this is shown in the form of a common push button 54.

FIG. 6 shows an arrangement for phase difference sensing detection. Here each device 61 is assumed to be a meter relay (or equivalent) and for simplifying the drawing the locking coils and controlling contacts are omitted. In FIG. 6 every other (or odd lead) signal is taken to the primary 62 of a different one of plural transformers each having a pair of center tapped secondary windings 63, 64. The center taps of all the secondaries are tied to a common ground bus 65. Rectifiers 66 are used to feed the signal from each secondary to the associate meter relay but this signal is nulled by a balancing potentiometer 67 connected across the line leading to the meter relay signal coil and having an adjustable tap fed each by a different in-between (or even) signal lead. Thus, any phase shift between adjacent amplifier outputs will result in the development of a D.C. voltage across the meter relay signal coil. The meter relays are preferably of the zero center type, deflecting usably with signals of either polarity and providing convenient means for correctly adjusting nulling potentiometers 67.

In FIG. 7 an arrangement is shown for mechanical scanning of a preferably stationary, or relatively slowly moving, sample, for example near welds. A scanning drive motor 71 turns gears 72 and helical screws 73 one of which moves a flux producing coil means support 74 across the width of the sample 10, while the other screw 73 moves a correspondingly located receiving coil support 75 to simultaneously scan the width on the opposite side of the sheet. This has the advantage of needing very little amplification electrical equipment, so that it is an electrically simple technique. Since the sample is not moving a difference signal is obtained whenever a flaw boundary passes between the two axes (11–13, and 12–14) which pass through the material.

Alternatively, to inspect preferable stationary samples across the width, instead of the mechanical scanning of FIG. 7, there may be electrical scanning as in FIG. 8 where plural flux producing coils 11, 12, 11', etc. are arranged across the sheet with a corresponding number of pickup coils 13, 14, 13', etc., across the opposite side of the sheet while scanning switches 81, 82, 83 operate mechanically in tandem so that only two flux producing coils are switched onto the line and only two sensing coils are switched to amplifying and readout device at any one time. If sufficient exciting power is conveniently available, only the sensing coil connections need be switched for the energizing coils could be connected in parallel as in FIGS. 1, 2 or 3.

Heretofore, it has not been customary to use magnetic phenomena for the testing of non-magnetic sheet material (such as sheet aluminum), while in the case of sheet steel those in the art apparently felt that the steel forms a magnetic shield which could not be penetrated by flux generated on one side and sought to be picked up on the opposite side of the sheet. To the contrary, I have found that eddy currents are produced in such metals by the flux generated in the field and do pass through, or possibly create new flux which creates new eddy currents which creates new flux, etc. so the effect does pass through such sheet material whether magnetic or non-magnetic.

This may be better understood by reference to FIG. 9 which shows a pair of flux generating coils which are similarly wound in space. When A.C. is applied to the coils instantaneous flux takes the direction of the axes F and in the conductive sample eddy currents are set up as shown by the circles E, and these eddy currents set up a new flux and so on through the sheet so that the flux can be sensed by pickup coils (not shown). This FIG. 9 arrangement of coils may be most sensitive to pits, surface scratches and vertical cracks because such flaws will produce the biggest effect on such eddy currents.

In FIG. 10 the flux producing coils are oppositely wound with respect to one another in space (or they could have been like wound and oppositely connected) so that one produces an instantaneous flux $F_1$ while the other produces in opposite direction an instantaneous flux $F_2$, and the eddy currents E instead of being in the plane of the larger dimensions of the sheet will be transverse thereto as shown at $E_2$ in FIG. 10. This arrangement may be most sensitive to common faults referred to as laminations, pipes, etc., but is also sensitive to thickness changes. Instead of the multi coils of all figures of the drawings there could (within the present invention scope) be just a single flux coil (e.g. with the mechanical scanning of FIG. 7) and just a single opposite side of sheet pickup coil, with differences of signal read according to time (i.e., travel) instead of as between pickup coils, even though this would sacrifice the advantage of cancelling out of extraneous noise as referred to in the co-pending application.

One thing which all the arrangements of FIGS. 1, 2, 3, 7, 8, 9 and 10 have in common, is that no iron cores are provided for either flux producing or sensing coils. Iron cores in such coils would make the equipment more sensitive but, I believe, would increase sensitivity to minute changes in thickness of sample (because spurious signals are caused by any minute change in distance between any such coil core and sample). The elimination of iron cores for the various coils of course causes some signal loss, but this can be more than made up for through the electronic amplification. Without iron cores for the coils, the job of nondestructive testing for flaws is accomplished very impressively, the equipment giving the impression of behaving like an electronic X-ray, the effect being as though the energizing field passes right through the sample, and if there is a lamination or other flaw the "passed through" field appears to be considerably reduced, apparently due to the decrease of eddy currents in the flaw (or air gap in the flux path if the sample is of magnetic material).

There is thus provided apparatus capable of meeting the objects above set forth.

In brief, the apparatus may comprise two energizing and two pickup coils. As shown, they have their axes normal to the extended plane of the sample. The energizing coils may be connected so that the fields from them either normally cancel (FIG. 9) or add (FIG. 10). With respect to one another the pickup coils can be wound either the same or oppositely in space but the pickup coils are connected, or at least detected, differentially, so that ambient magnetic fields are substantially cancelled as in the co-pending application, and this cancellation may be made as complete as necessary by adjustment of potentiometers (for the non flaw conditions). When the boundary of a flaw F (see FIG. 10) is between two energizing and pickup coil combinations, there results a large unbalanced signal which is quite specific and easy to detect because it is not likely that it is produced by non-flaw conditions.

While I have illustrated and described particular embodiments, various modifications may obviously be made without departing from the true spirit and scope of the invention which is intended to be defined by the appended claims taken with all reasonable equivalents. The invention is not limited to inspection of flaw sheet material but has application to any proper material having thickness as its minor dimension. Thus it would be useful for finding flaws in a tubing (for example with flux producing means outside and pickup means inside), and perhaps even for wire or rod inspection. Alternatively, flux and pickup means could be on opposite sides of material to be inspected (e.g. tangentially to either side of a lengthwise weld which forms a tube of sheet material) without even being on opposite sides of the material as regards its thickness.

I claim:
1. Apparatus for detecting a flaw in material having thickness as a minor dimension with a major plane transverse thereto and which material is magnetic or electrically conductive, the combination of, flux producing coils each having a winding axis normal to said major plane, flux sensing coils each having a winding axis normal to said major plane and which is substantially an extension of the axis of one of the flux producing coils with the flux producing coils on the one hand and the flux sensing coils on the other located on opposite sides of the material, means including connections for supplying alternating current to the flux producing coils, difference detection means connected to the sensing coils and provided for comparing signals from different sensing coils, the arrangement being further characterized by the flux producing coils being spaced from one another in a direction along the material transverse to the direction of the coil axes, the flux sensing coils whose axes are extensions of the flux producing coil axes thus being correspondingly spaced.

2. In apparatus for detecting a flaw in a conductive material which moves relative to said apparatus, the combination as in claim 1 further characterized by there being on the one side of the material plural pairs of flux producing coils with each pair having coils which are relatively displaced along the direction of relative motion while the pairs are displaced from one another transverse to the direction of relative motion, and the sensing coils being similarly arranged on the opposite side of the material in a like number of plural pairs.

3. In apparatus for detecting a flaw in a conductive material which is stationary with respect to said apparatus during inspection, the combination of claim 1 further characterized by the flux producing coils being arranged along a selected portion across the width of the material, the sensing coils being correspondingly arranged on the opposite side of the material along the selected portion across the width of the material.

4. Apparatus as in claim 1 further characterized by readout apparatus subsequent to said difference detection means which includes a neon tube.

5. Apparatus as in claim 1 further characterized by readout apparatus subsequent to said difference detection means which includes a meter.

References Cited by the Examiner

UNITED STATES PATENTS

| | | | |
|---|---|---|---|
| 2,011,665 | 8/1935 | Watts | 324—37 |
| 2,331,418 | 10/1943 | Nolde | 324—34 |
| 2,531,413 | 11/1950 | Dionne | 324—37 |
| 3,020,472 | 2/1962 | Cauley | 324—40 |

FOREIGN PATENTS 722,937   2/1955   Great Britain.

WALTER L. CARLSON, *Primary Examiner.*

FREDERICK M. STRADER, *Examiner.*